E. NUEBLING.
MEASURING APPARATUS.
APPLICATION FILED NOV. 19, 1910.

1,035,225.

Patented Aug. 13, 1912.

2 SHEETS—SHEET 1.

WITNESSES:
G. V. Rasmussen
Eugene Eble

INVENTOR
EDWARD NUEBLING
BY Briesen Knauth
Fritz v. Briesen
ATTORNEYS

E. NUEBLING.
MEASURING APPARATUS.
APPLICATION FILED NOV. 19, 1910.
1,035,225.
Patented Aug. 13, 1912.
2 SHEETS—SHEET 2.
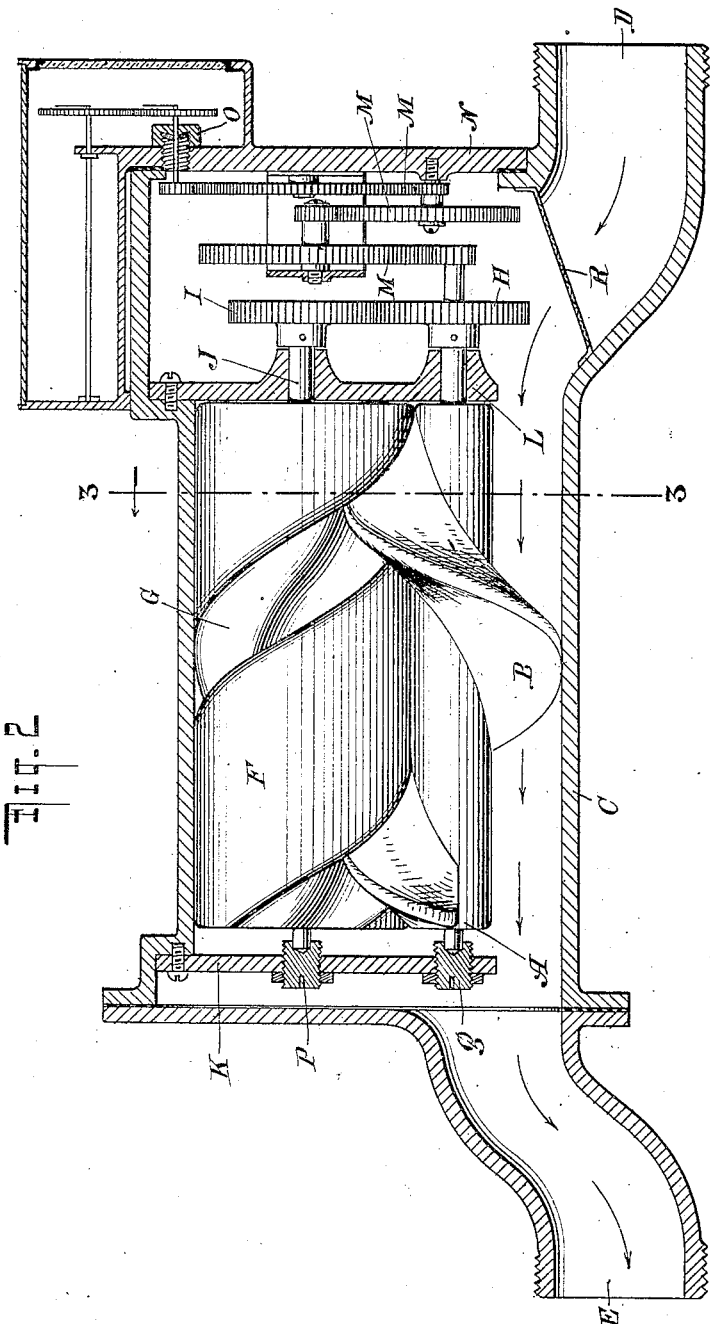
WITNESSES:
G. V. Rasmussen
Eugene Eble
INVENTOR
EDWARD NUEBLING
BY
ATTORNEYS

UNITED STATES PATENT OFFICE.

EDWARD NUEBLING, OF NEW YORK, N. Y.

MEASURING APPARATUS.

1,035,225.  Specification of Letters Patent.  Patented Aug. 13, 1912.

Application filed November 19, 1910. Serial No. 593,231.

*To all whom it may concern:*

Be it known that I, EDWARD NUEBLING, a citizen of the United States, and resident of the borough of Manhattan, city, county, and State of New York, have invented certain new and useful Improvements in Measuring Apparatus, of which the following is a specification.

My invention relates to improvements in the construction and operation of meters and has for its object to provide an instrument of simple and practical construction that will automatically measure the quantity of the fluid which passes through it.

It is particularly adapted to metering of water, but may of course be readily adapted to the measuring of other fluids, either liquid or gaseous.

The invention is illustrated in the accompanying drawings, in which—

Figure 1:
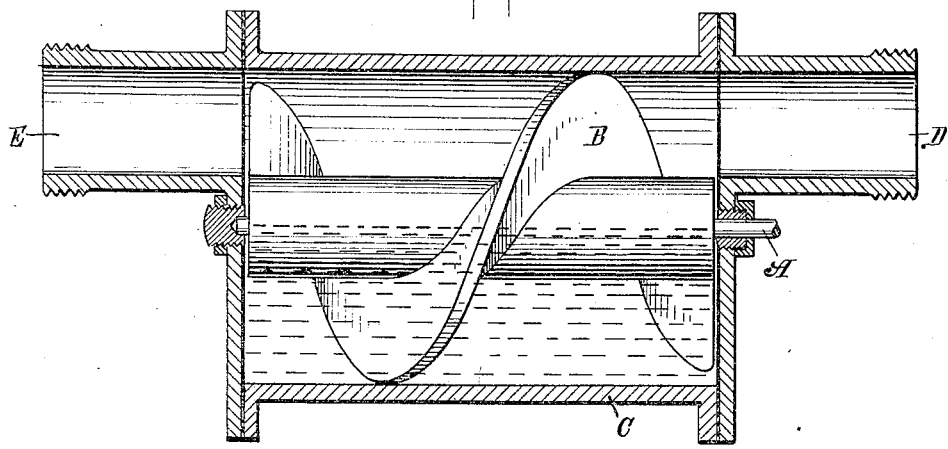
Figure 3:
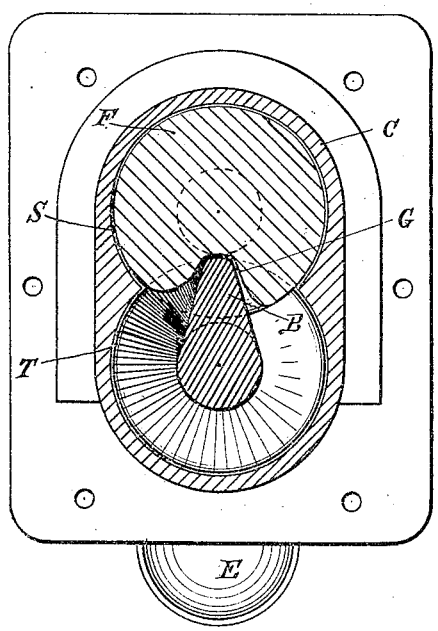

Figure 1 is a side view, partly in section; Fig. 2 is a similar view of a modified form of my device; Fig. 3 is a section on line 3—3 of Fig. 2.

In Fig. 1, A represents a rotary shaft carrying a helical thread B, which is shown in this view as having one and one-half convolutions. The pitch of this screw is sufficiently acute to cause the shaft to revolve upon the application of pressure to the surface of the screw.

C represents the case which carries the shaft A and helical screw B. This case C has an inner cylindrical surface corresponding with the cylindrical figure defined by a rotation of the helical screw; in other words, the screw fits snugly within the case C in any position which it may assume. The case C is partly filled with mercury or other suitable liquid to the depth of preferably the axial line of the shaft A.

D represents the inlet opening for the fluid to be measured and E the outlet.

The fluid to be measured entering at D comes in contact with the face of the screw B, but because of the mercury seal at the bottom and the snug fitting sides of the case C is unable to pass beyond this point unless the shaft A is rotated. This rotation is of course accomplished by the pressure of the fluid to be measured. It is further apparent that as the fluid to be measured passes through the upper portion of the case C to the outlet E it will continuously rotate the screw B and carry over only a certain fixed quantity of fluid per rotation; in other words, a definite fixed quantity of fluid will pass through the device for each revolution of this screw and that quantity will be automatically indicated by an ordinary dial device which registers the number of the revolutions of the shaft A.

In a device of the character represented in Fig. 1 it is essential that the sealing medium, which I have thus far termed "mercury," shall be of a consistency which will not unduly yield to the pressure of the fluid to be measured. It is also preferably of a constitution which will not react chemically with the fluid to be measured. The helical screw should be mounted to rotate freely so as to avoid the possibility of the mercury being carried into the outlet E as a result of undue pressure of the fluid to be measured.

The device illustrated in Fig. 2 embodies the same principle as that described in connection with Fig. 1, but is adapted more particularly for fluid entering the meter at high pressure. In Fig. 2, instead of the mercury seal, I employ a cylindrical seal. This cylindrical seal F is provided with a groove G which exactly matches the thread of the screw B. The coil of the spiral fits into this groove closely so as to effect a tight seal along the meeting edges at all times between groove and coil. The fluid entering the device at D rotates the shaft A as described in connection with Fig. 1 because the fluid has no other outlet from the device except that furnished by the rotation of said shaft. In rotating the shaft A and the coil B, as the fluid passes to the outlet E, the cylinder F is similarly rotated in an opposite direction. In Fig. 2 this counter rotation of the cylinder F is accomplished by means of the action of the pressure of the fluid to be measured against the sides of the helix. The two intermeshing similar gear wheels H and I are attached to one end of the shaft A and the shaft J of the cylinder F for the purpose of reducing wear by friction between the helical thread and the groove of the cylinder. Bearing plates K and L serve to maintain the alinement between the cylinder F and shaft A. The train of gears designated as M are reduction gears to allow the indication in convenient units of measure. This train of gears M is mounted on a plate N which is readily removable so as to give access to the chamber for the purposes of cleansing and repairing. The stuffing box O contains the means of connection between the internal train of gears and the external and visible dials. P and Q are adjustable bearings for the shaft J of the cylinder and the shaft A of the helix. R is a screen to prevent solid foreign articles from entering the interior of the casing C. This casing C which is shown in section in Fig. 3 has an opening in the shape of two segments of cylinders S and T; S corresponding with the outer surface of the cylinder F, and T with the outer surface of the cylinder defined by the rotation of the helix B.

The essential feature of my invention resides in the fact that there is interposed between the inlet and outlet openings of the device a chamber, the open portion of which is rounded to correspond to the rotation of a helical screw so that there shall be comparatively a snug fit between the outer edge of the screw and the interior of the chamber; said chamber must also contain a rotating shaft for the helical screw freely rotatable by the action of the pressure of the fluid to be measured against the sides of the helix. The open space in said chamber between the two ends of the helical screw must be ascertainable as the unit of calculation. This quantity having been once ascertained it can readily be translated into gallons, cubic feet, or other convenient unit of measure by the proper arrangement of gears or the like such as shown in Fig. 2.

Having now described my invention what I claim is:

1. A measuring apparatus comprising a stationary cylindrical chamber having an inlet and an outlet opening for the fluid to be measured, a shaft located in said chamber and freely rotatable therein, a helical screw on said shaft extending substantially to the inner surface of said chamber, and means for progressively obstructing a portion of said chamber against passage of the fluid to be measured, said obstructing means being arranged to accommodate itself to the rotation of the screw, and means operated by the shaft for registering the volume of fluid that has passed through said chamber.

2. A measuring apparatus comprising a stationary cylindrical chamber having an inlet and an outlet opening for the fluid to be measured, a shaft located in said chamber and freely rotatable therein, a helical screw on said shaft extending substantially to the inner surface of said chamber, means for progressively obstructing a portion of said chamber against passage of the fluid to be measured, and means operated by the shaft for registering the volume of fluid that has passed through said chamber.

In testimony whereof I have signed this specification in the presence of two subscribing witnesses.

EDWARD NUEBLING.

Witnesses:
 EUGENE EBLE,
 JOHN A. KEHLENBECK.